US009669581B2

(12) United States Patent
García Martín et al.

(10) Patent No.: US 9,669,581 B2
(45) Date of Patent: Jun. 6, 2017

(54) METHOD FOR MANUFACTURING AN AERONAUTICAL TORSION BOX, TORSION BOX AND TOOL FOR MANUFACTURING AN AERONAUTICAL TORSION BOX

(71) Applicant: AIRBUS OPERATIONS S.L., Getafe (Madrid) (ES)

(72) Inventors: Diego García Martín, Getafe (ES); Carlos Romón Banogon, Getafe (ES); Pablo Cebolla Garrofe, Getafe (ES); Francisco Javier Honorato Ruiz, Getafe (ES); Aquilino García García, Getafe (ES); Francisco Javier Chamorro Alonso, Getafe (ES); Julio Núñez Delgado, Getafe (ES)

(73) Assignee: Airbus Operations S.L., Madrid (ES)

( * ) Notice: Subject to any disclaimer, the term of this patent is extended or adjusted under 35 U.S.C. 154(b) by 349 days.

(21) Appl. No.: 14/494,012

(22) Filed: Sep. 23, 2014

(65) Prior Publication Data

US 2015/0343702 A1  Dec. 3, 2015

(30) Foreign Application Priority Data

Sep. 23, 2013  (EP) .................................... 13382366

(51) Int. Cl.
*B64F 5/00* (2006.01)
*B29C 65/48* (2006.01)
(Continued)

(52) U.S. Cl.
CPC .......... *B29C 65/4805* (2013.01); *B29C 33/30* (2013.01); *B29C 33/485* (2013.01);
(Continued)

(58) Field of Classification Search
CPC  B64C 3/26; B64C 3/185; B64C 3/187; B64C 3/18; B64C 3/182; B64C 3/20; B64C 1/26; B64C 1/12; B64C 9/02
(Continued)

(56) References Cited

U.S. PATENT DOCUMENTS

| 4,749,155 A | 6/1988 | Hammer et al. |
| 5,242,523 A * | 9/1993 | Willden ................ B29C 70/44 |
| | | 156/245 |

(Continued)

FOREIGN PATENT DOCUMENTS

| EP | 1 400 341 | 3/2004 |
| EP | 2 153 979 | 2/2010 |

(Continued)

OTHER PUBLICATIONS

Extended European Search Report dated Feb. 19, 2014 in EP 13382366.6, 6 pages.

*Primary Examiner* — Benjamin P Lee
(74) *Attorney, Agent, or Firm* — Nixon & Vanderhye P.C.

(57) ABSTRACT

Method for manufacturing a base structure (8) of an aeronautical torsion box (1) for an aircraft (11) characterized in that it comprises the steps of:
a.—providing at least a fresh skin (3), at least one fresh stringer (4), at least a fresh front spar (5) and fresh rear spar (6),
b.—positioning the fresh skin (3), the at least one fresh stringer, the fresh spars (5, 6) in a curing tool in a configuration corresponding to that of a base structure (8),
c.—subjecting the structure (8) to a single curing cycle, obtaining a cured base structure (8).

10 Claims, 9 Drawing Sheets

(51) Int. Cl.
*B29C 33/48* (2006.01)
*B64C 3/00* (2006.01)
*B64C 3/18* (2006.01)
*B64C 3/24* (2006.01)
*B64C 5/00* (2006.01)
*B29C 33/30* (2006.01)
*B29D 99/00* (2010.01)
*B64F 5/10* (2017.01)
*B29L 31/30* (2006.01)

(52) U.S. Cl.
CPC ............ *B29D 99/0014* (2013.01); *B64C 3/00* (2013.01); *B64C 3/18* (2013.01); *B64C 3/24* (2013.01); *B64C 5/00* (2013.01); *B64F 5/10* (2017.01); *B29L 2031/3076* (2013.01)

(58) Field of Classification Search
USPC .................. 244/117 R, 123.1, 123.8, 123.9
See application file for complete search history.

(56) References Cited

U.S. PATENT DOCUMENTS

| | | | |
|---|---|---|---|
| 5,454,895 A | 10/1995 | Imparato | |
| 5,817,269 A | 10/1998 | Younie et al. | |
| 6,306,239 B1 | 10/2001 | Breuer et al. | |
| 6,320,118 B1 | 11/2001 | Pridham et al. | |
| 6,776,371 B2 * | 8/2004 | Tanaka | B64C 3/20 156/182 |
| 6,808,143 B2 * | 10/2004 | Munk | B23P 21/00 244/123.1 |
| 6,823,578 B2 | 11/2004 | Anderson et al. | |
| 7,806,367 B2 | 10/2010 | Munoz Lopez et al. | |
| 8,695,219 B2 * | 4/2014 | Munk | B64F 5/0009 244/123.1 |
| 8,919,697 B2 * | 12/2014 | Parker | B64C 3/26 244/123.1 |
| 9,216,812 B2 * | 12/2015 | Guinaldo Fernadez | B64C 3/18 |
| 2001/0051251 A1 * | 12/2001 | Noda | B32B 3/18 428/119 |
| 2002/0078545 A1 * | 6/2002 | Munk | B23P 21/00 29/407.01 |
| 2003/0042364 A1 * | 3/2003 | Tanaka | B64C 3/20 244/123.2 |
| 2003/0192990 A1 * | 10/2003 | Simpson | B29C 37/0064 244/123.7 |
| 2004/0070108 A1 * | 4/2004 | Simpson | B29C 70/342 264/236 |
| 2005/0116105 A1 * | 6/2005 | Munk | B64F 5/0009 244/123.8 |
| 2005/0236524 A1 | 10/2005 | Sarh | |
| 2006/0249626 A1 | 11/2006 | Simpson et al. | |
| 2007/0107189 A1 * | 5/2007 | Prichard | B29C 33/307 29/448 |
| 2007/0120013 A1 * | 5/2007 | Levers | B21D 26/021 244/117 R |
| 2008/0265093 A1 * | 10/2008 | Munoz Lopez | B29C 70/342 244/119 |
| 2009/0206203 A1 * | 8/2009 | Crawford | B64C 3/187 244/123.7 |
| 2009/0320398 A1 | 12/2009 | Gouvea | |
| 2010/0000667 A1 * | 1/2010 | Funnell | B29C 33/306 156/189 |
| 2011/0139932 A1 * | 6/2011 | Matheson | B64C 3/182 244/132 |
| 2011/0168324 A1 | 7/2011 | Ender | |
| 2012/0132748 A1 * | 5/2012 | Axford | B64C 3/26 244/119 |
| 2013/0240130 A1 * | 9/2013 | Funnell | B29C 33/306 156/189 |
| 2015/0183506 A1 * | 7/2015 | Garcia Martin et al. | B32B 37/02 244/123.1 |

FOREIGN PATENT DOCUMENTS

| | | | |
|---|---|---|---|
| GB | 733177 A * | 7/1955 | ............... B64C 3/26 |
| WO | 2008/020158 | 2/2008 | |
| WO | 2013/089598 | 6/2013 | |

* cited by examiner

METHOD FOR MANUFACTURING AN AERONAUTICAL TORSION BOX, TORSION BOX AND TOOL FOR MANUFACTURING AN AERONAUTICAL TORSION BOX

This application claims priority to EP Application No. 13382366.6 filed on Sep. 23, 2013, the entire content of which is hereby incorporated by reference.

TECHNICAL FIELD OF THE INVENTION

The present invention belongs to the field of aircraft structures and, more particularly, to the field of methods for manufacturing torsion boxes.

BACKGROUND OF THE INVENTION

Airplanes have been most or totally built up from metallic components providing a good performance in terms of mechanical behaviour but, as a drawback, they also provide too much weight.

With the increase of competition among the airlines, airframe manufacturers search new ways of improving specific performances, meaning increasing or maintaining structural characteristics and decreasing weight against metallic builds.

One of the most important solutions is the use of composite fibre reinforced polymers (CFRP) for major structural parts, achieving important weight and operating costs savings. The first aircraft with a large CFRP composition is the Airbus 320, with more than 20%.

In summary, composites have been demonstrated to fulfil the following requirements:

Weight savings.
Be cost effective.
Meet structural requisite under aircraft conditions.
Beneficial cost/weight relation.

The main structure for aircraft lifting surfaces consists of a leading edge, a torsion box, a trailing edge, a root joint and a tip. The torsion box consists of several structural elements: upper and lower skins stiffened by stringers on one hand, and spars and ribs on the other hand. Typically, the structural elements forming the torsion box are manufactured separately and are joined with the aid of complicated tooling to achieve the necessary tolerances, which are given by the aerodynamic, assembly and structural requirements. Nowadays, and particularly in the aeronautical industry, composite materials with an organic matrix and continuous fibres, especially CFRP (Carbon Fibre Reinforced Plastic), are widely used in a great variety of structural elements. For example, all the elements which make up a torsion box enumerated beforehand (ribs, stringers, spars and skins) can be manufactured using CFRP. Typically, of the different components which comprise a torsion box are manufactured separately and are thereafter assembled using rivets or other type of joining means.

There are several patents regarding integration of parts: U.S. Pat. No. 6,320,118B1 (Adhesively bonded joints in carbon fibre composite structures), U.S. Pat. No. 6,306,239B1 (Method of fabricating a stringer-stiffened shell structure using carbon reinforced composites), U.S. Pat. No. 4,749,155 (Method of making wing box cover panel), U.S. Pat. No. 5,454,895 (Process of manufacturing fibre reinforced structures suitable for aerodynamic applications), U.S. Pat. No. 5,817,269 (Composite fabricating method and tooling to improve part consolidation), all of them describing integration methods with a certain degree.

Another patent that describes a large degree of integration is the EP2153979A1, (Integrated multispar torsion box composite material), which also proposes a change in the typical arrangement of a torsion box formed by skin, stringers, front and rear spar and ribs. Nonetheless, this patent document concerns the integration of a multispar torsion box, with no ribs.

These solutions of the state of the art present the following technical problems:

Technical problems related to structures using rivets are, mainly:
the addition of weight to the resulting structures and assembly time longer than desired.

On the other hand, integrated structures also have problems such as:
They require very complex tooling, which sometimes even renders the process unprofitable.
it is desirable to save more time in the manufacture and the assembly of different parts of torsion boxes, especially those comprising ribs, There is a need for a solution providing a compromise between no integration and total integration so that the mentioned problems can be solved. It is desirable to have structures for which the number of rivets can be minimized by integrating different components which make up the structure in the least number of curing cycles possible. Even though there can be found, in the state of the art, solutions aiming to do so, these solutions still fail in providing the appropriate tooling in terms of complexity.

In this document the wording "composite material" is understood as any type of material, for example CFRP (Carbon Fibre Reinforced Polymers), which comprises two or more physically distinguishable parts and mechanically separable, the two or more parts not being able to dissolve among each other.

In the present description the following terms are defined as:
Co-curing: the process of joining two composite laminates provided in a fresh state by means of a single curing cycle. The resulting joint is certified for primary structures.
Co-bonding: the process of joining a composite laminate provided in a fresh state to a cured composite laminate by means of a curing cycle and the application of an adhesive along the joining surface of the laminates. The resulting joint is certified for primary structures.
Bonding: the process of joining two cured composite parts by means of an adhesive material. It is not certified for joining primary structures.
Mechanical bonding the process of joining two parts by means of fastening means, such as rivets or bolts The resulting joint is certified for primary structures.

SUMMARY OF THE INVENTION

The present invention provides an improved solution for the aforementioned problems, by a method for manufacturing a base structure of an aeronautical torsion box.

In a first aspect of the invention there is provided a method for manufacturing a base structure of an aeronautical torsion box for an aircraft characterized in that it comprises the steps of:
  a.—providing at least a fresh skin, at least one fresh stringer, and at least two fresh spars
  b.—positioning the fresh skin, the at least one fresh stringer and the fresh spars in a curing tool in a configuration corresponding to that of a base structure, c.—subjecting the structure to a single curing cycle, obtaining a cured base structure.

The base structure for an aeronautical torsion box according to the invention comprises the parts described in step a.—.

In step b.—the configuration of a base structure is such that at least one stringer and at least two spars are positioned on the lower skin and joined to it along their flanges.

In step c.—the positioned parts are subjected to a curing cycle, for example in an autoclave.

In a second aspect of the invention there is provided a method for manufacturing an aeronautical torsion box for an aircraft characterized in that it comprises the steps of:
d1.—providing a cured structure manufactured according to the first aspect of the invention,
d2.—providing an additional skin, and
d3.—joining the additional skin to the cured structure.

The method according to the second aspect of the invention allows assembling a structure obtained with a method according to the first aspect of the invention with an additional or upper skin, which can comprise stringers, in such a way that a torsion box is manufactured and assembled, which advantageously provides a compromise between no integration and total integration so that the mentioned problems of the state of the art are solved.

The method allows having structures for which a minimum number of rivets are needed when integrating and a minimum number of curing cycles is performed.

The upper skin is joined by any joining method.

The technical advantages of a method for manufacturing a torsion box according to the invention are:
the number of curing cycles for obtaining a torsion box with respect to the state of the art is reduced,
weight of the complete structure is reduced as a reduced amount of rivets is used,
assembly time is reduced because instead of manufacturing individual pieces such as lower skin, ribs, stringers or stringers and fastening one to each other by mechanical means such as rivets, the torsion box is treated as two separate parts which are joined:
  1. the first part is the base structure which is integrated in step c., thus eliminating the need of mechanical fastening means, such as rivets for all the components to be joined, as well as parts positioning, gap measurement, shiming, etc.
  2. the second part is the additional, upper or lower, skin which is subsequently joined to the first part by any joining method.

In a third aspect of the invention there is provided a tooling for manufacturing a base structure of a torsion box by a method according to the first aspect of the invention, the tooling comprising:
base modules adapted to house at least one stringer by means of at least one groove,
a caul plate.

In a fourth aspect of the invention there is provided an aeronautical torsion box structure comprising a front spar, a rear spar, at least one rib, a lower skin and at least one stringer characterized in that it is manufactured with a method according to the second aspect of the invention.

In a fifth aspect of the invention there is provided an aircraft comprising an aeronautical torsion box structure according to the fourth aspect of the invention.

DESCRIPTION OF THE DRAWINGS

These and other characteristics and advantages of the invention will become clearly understood in view of the detailed description of the invention which becomes apparent from a preferred embodiment of the invention, given just as an example and not being limited thereto, with reference to the drawings.

DETAILED DESCRIPTION OF THE INVENTION

Once the object of the invention has been outlined, specific non-limitative embodiments are described hereinafter.

All the features described in this specification (including the claims, description and drawings) can be combined in any combination, with the exception of combinations of such mutually exclusive features.

Figure 8:
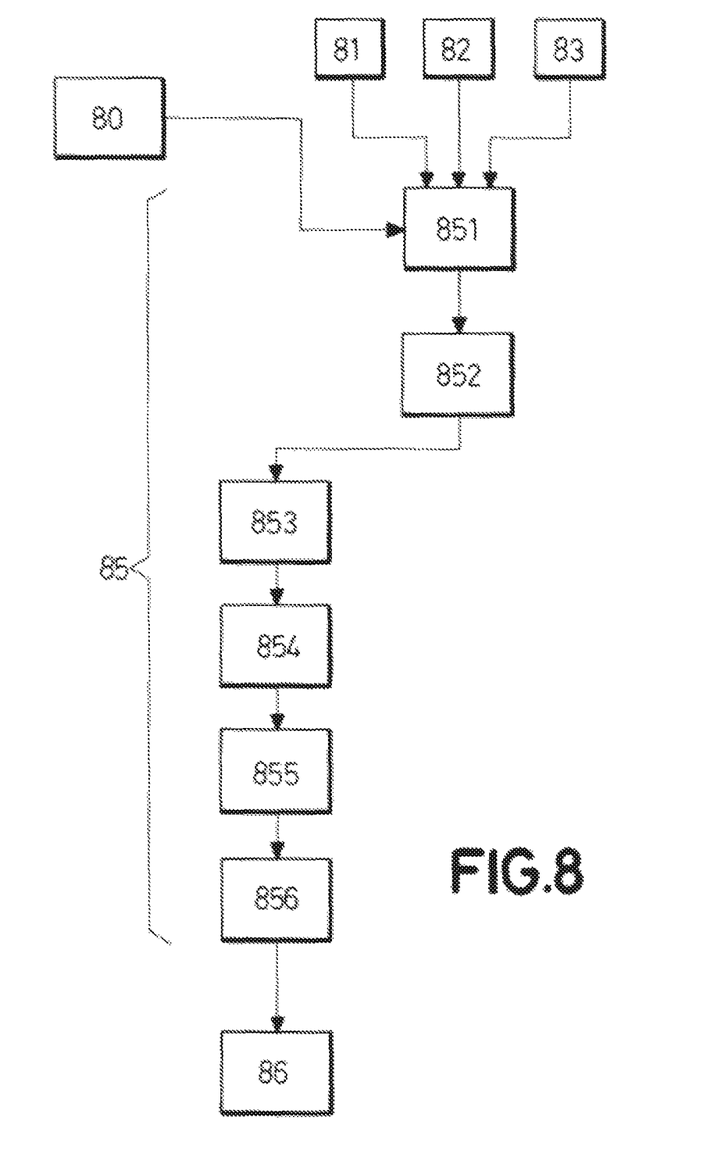
FIG. 8 This figure shows a diagram representing the steps carried out in a process for manufacturing a torsion box (1) according to the invention.

Method for Manufacturing a Base Structure (8) of an Aeronautical Torsion Box (1):

The process which is represented in FIG. 8 shows several steps comprised in a method for manufacturing a base structure (8) of an aeronautical torsion box (1) according to the invention. An explanation is therefore set out herein as a particular example.

The method for manufacturing a base structure (8) of an aeronautical torsion box (1) for an aircraft (11) according to the invention comprises the steps of:
a.—providing (81, 82, 83) at least a fresh lower skin (3), at least one fresh stringer (4), at least two fresh spars (5, 6), b.—positioning the fresh lower skin (3), the at least one fresh stringer, the fresh spars (5, 6) in a curing tool in a configuration corresponding to that of a base structure (8), c.—subjecting the structure (8) to a single curing cycle, obtaining a cured base structure (8).

Figure 4:
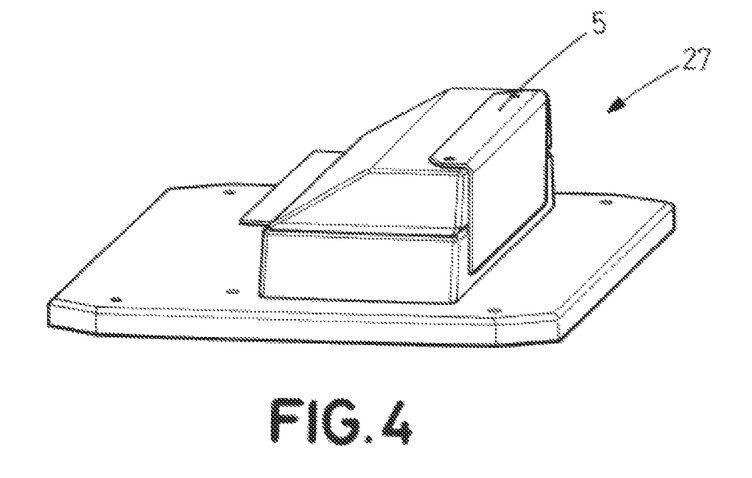
FIG. 4 This figure shows a male mould (27) for forming the spars (5, 6).

STEP a.—The parts provided (81, 82, 83) in step a.—can be manufactured with any method known in the state of the art before being provided. In FIG. 8, the references represent the steps of:

providing (81) the fresh lower skin (3), providing (82) the fresh spars (5, 6), which can be manufactured using a male mould (27) like the one represented in FIG. 4, providing (83) the fresh stringers (4).

In a particular embodiment the method for manufacturing a base structure (8) is performed in such a way that:

in step a.—there is further provided (80) at least one rib (2) in step b.—the at least one rib (2) is positioned along with the rest of elements. An adhesive is used for positioning the ribs, the adhesive being positioned on the edges (26) of the ribs (2).

The adhesive on the edges (26) of the rib (2) allows joining the rib (2) to the rest of the structure before subjecting the structure (8) to a single curing cycle. The advantage of this particular example is that the ribs (2) are integrated in the structure during the curing cycle so that total assembly time is reduced.

The ribs (2) which are provided are rigid. Depending on the material with which the ribs (2) are manufactured further elements such as rivets may be used, as in the case of having metallic ribs (2).

In FIG. 8, the reference 80 represents the step of providing (80) the at least one rib (2).

Figure 9:
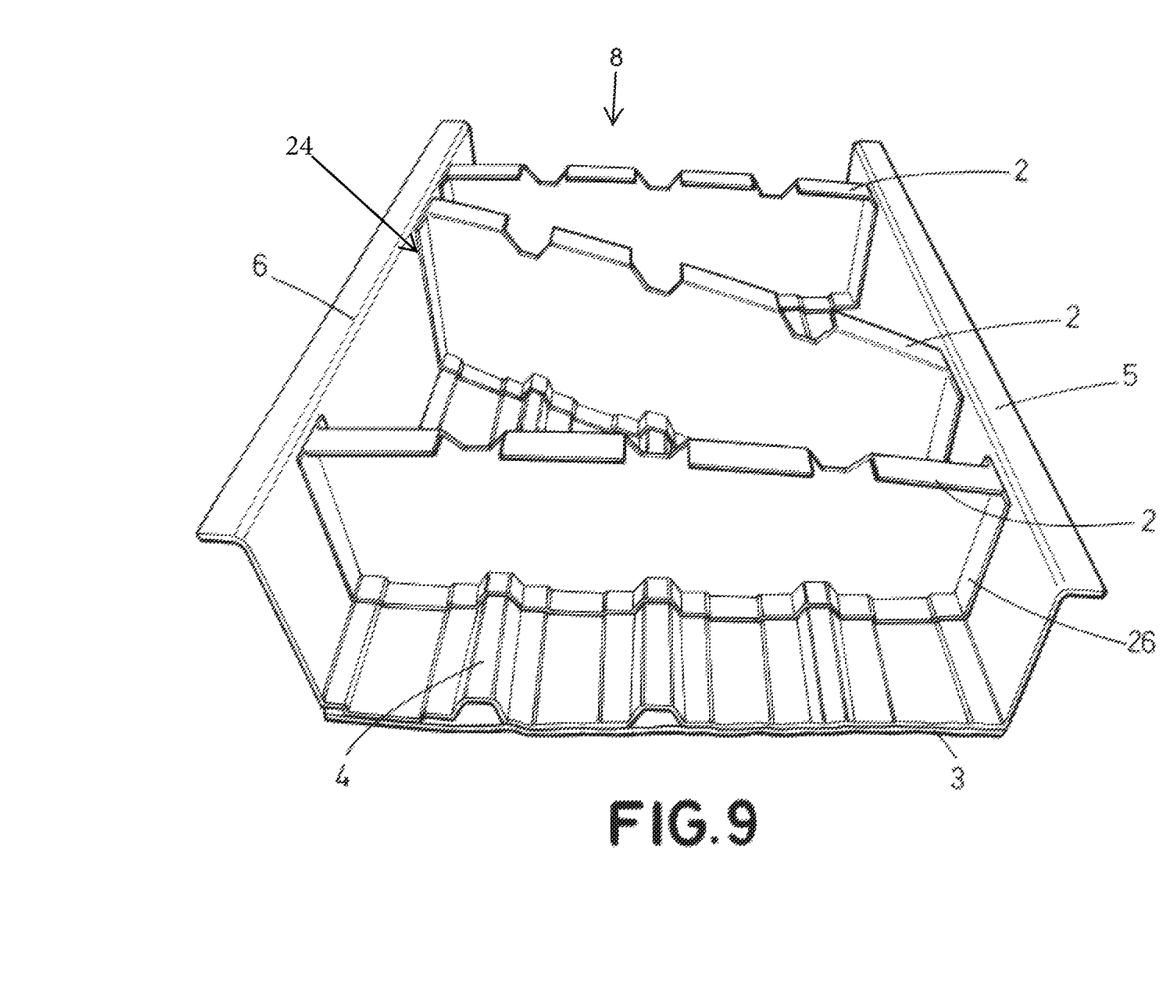
FIG. 9 This figure shows the base structure (8) of a torsion box (1) manufactured with a method according to the invention.

Performing the method of the particular example explained above, there is obtained a base structure (8) as represented in FIG. 9. FIG. 9 represents a base structure (8) comprising the parts:

ribs (2),
front and rear spars (5, 6),
lower skin (3),
stringers (4).

In a different particular embodiment, instead of integrating the ribs (2) before the curing cycle in step c.—, the ribs (2) are positioned after step c.—. In this particular example, the method for manufacturing a base structure (8) is performed in such a way that an additional step c1.—is performed after step c.—wherein step c1.—comprises joining at least one rib (2) by fastening means, preferably by means of rivets.

In a particular example, both if the ribs (2) are positioned before, or after the curing cycle in step c.—, the rib (2) is a cured rib (2) made of dry fiber.

In a particular example, either if the ribs (2) are positioned before or after the curing cycle in step c.—, the rib (2) is a cured rib (2) made of pre-preg.

Figure 1:
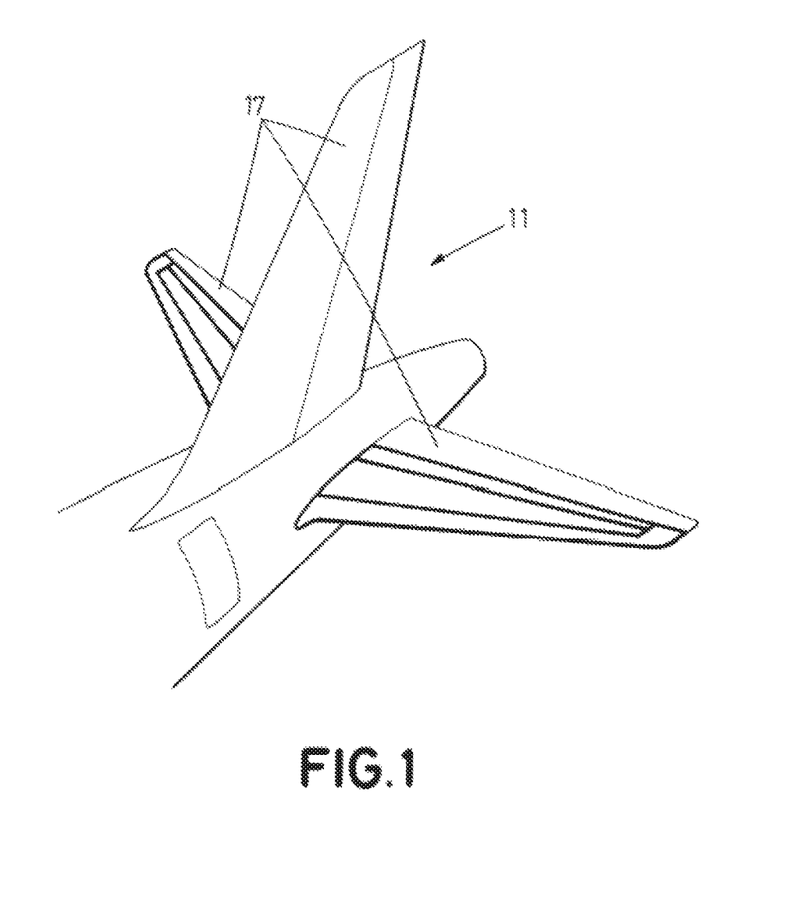
FIG. 1 This figure shows an example of an aircraft (11) comprising a lifting surface (17).
Figure 2:
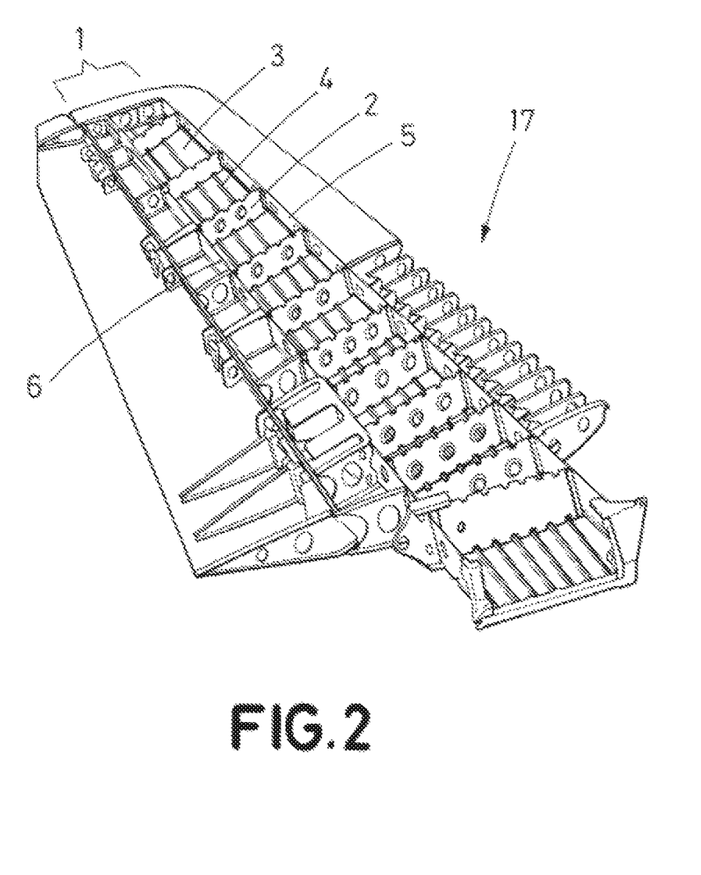
FIG. 2 This figure shows an example of a lifting surface (17) of an aircraft having a conventional torsion box (1) wherein different parts can be distinguished: front spar (5), a rear spar (6), at least one rib (2), a lower skin (3) and at least one stringer (4).
Figure 3:
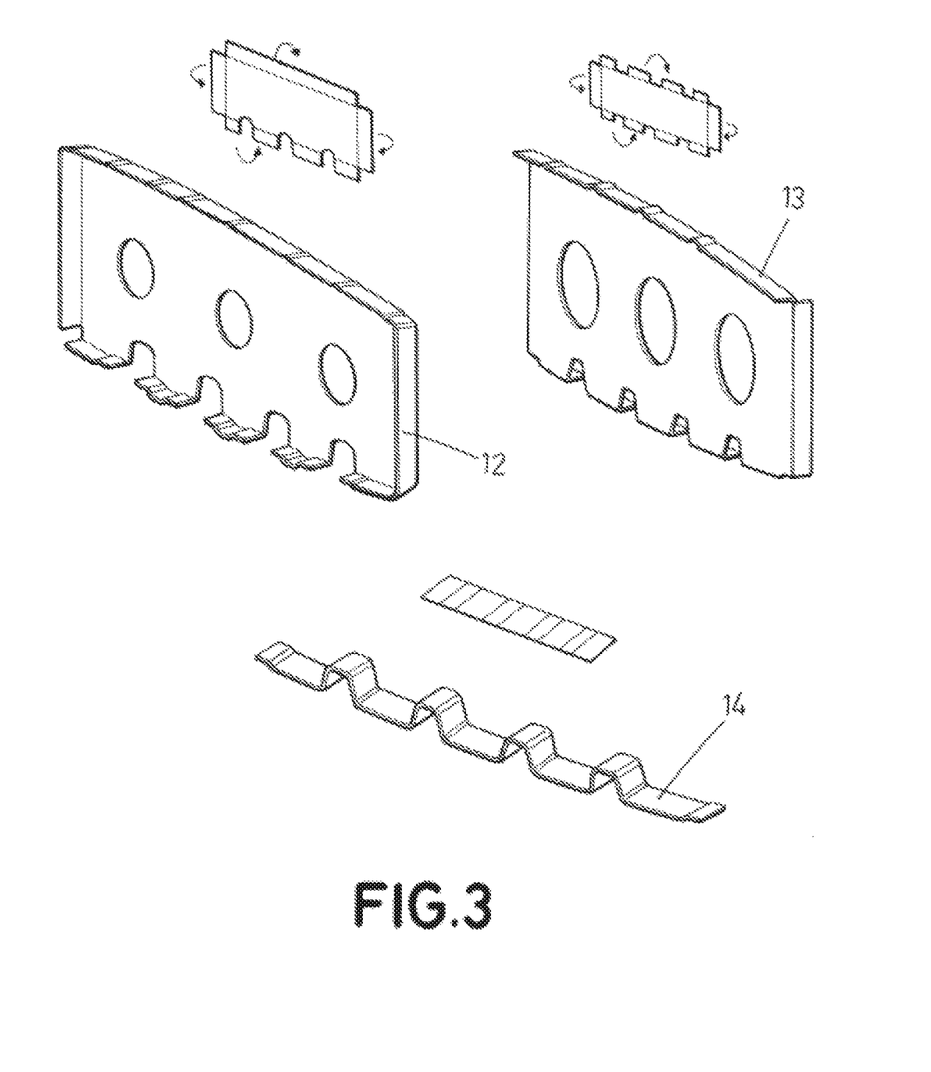
FIG. 3 This figure shows an example of preforms (12, 13, 14) for manufacturing the ribs (2).

In this particular example, the ribs (2) are manufactured for example via RTM (Resin Transfer Molding). In this manufacturing process preforms are built as shown in FIG. 3:

Preform 1 (12): C dry fibre form
Preform 2 (13): Z dry fibre form
Preform 3 (14): Babette dry fibre form.

Figure 7:
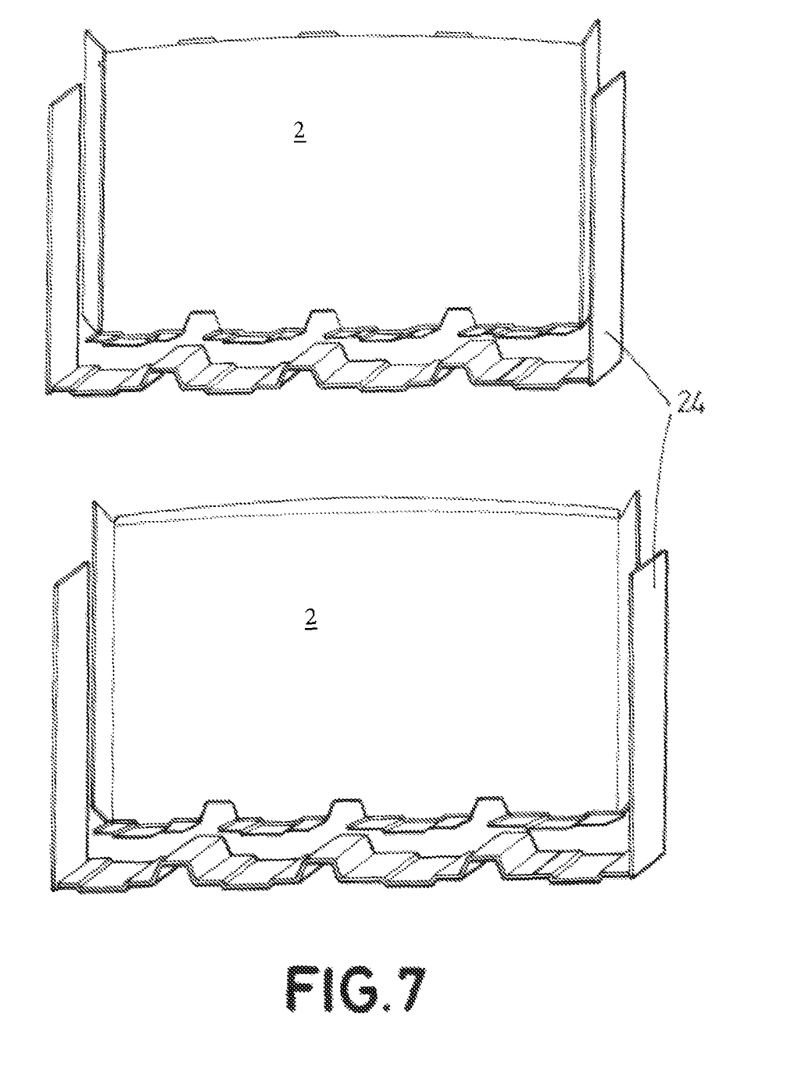
FIG. 7 This figure shows a babette (24) used for manufacturing a torsion box (1) according to the invention.

In a particular example, the rib (2) is provided (80) with a babette (24), as shown in FIG. 7. The technical advantage is that the babette (24) allows compacting the stringers, preferably omega stringers during the curing cycle.

In a method according to the invention a babette (24) is used in a particular shape adapted to join stringers, lower skin and spars. The babettes (24) used in the state of the art are adapted to particularly integrate skin and stringers, as a difference with the babette (24) used in the present invention, which is further adapted for the spars to be joined. Advantageously this provides the structure (8) with a good compaction in joining zones.

The babette (24) which is used in this particular example is specially shaped so as to cover stringers, skin and spars. Babettes which are used in the state of the art usually cover the web of the rib and the stringers but not the spars. In the proposed solution, the babette (24) is shaped with an extension part for being suitable for integrating the whole rib, stringers and spars, as it is shown in FIG. 7, wherein the ribs (2) are mounted using the babette (24) with an extension part covering the complete edge (26). A babette, in the context of this invention, is a strip covering the edges of three sides of a rib and is applied before the curing cycle.

The caul plate (22) is a sheet with the same size and shape as the aerodynamic surface on which it is placed. The caul plate (22) is placed in immediate contact during curing to transmit normal pressure and provide a smooth surface on the finished part.

The base modules (18) and the ribs (2) are shaped so as to provide grooves (15) on which stringers (4) are placed before curing.

In a particular embodiment, the base modules (18) are made of steel.

The ribs (2) are rigid parts, between the base modules (18).

The steps which are performed in the integration (85) phase with the tooling of the particular embodiment are represented in FIG. 8 and they are:

1. mounting (851) the ribs (2), the fresh lower skin (3), the fresh spars (5, 6), the fresh stringers (4) which have been provided (80, 81, 82, 83) previously, corresponding to steps a.—and b.—of a method according to the invention,
2. compaction (852) using a vacuum bag (25),
3. curing (853), corresponding to step c.—of the method according to the invention,
4. demoulding (854),
5. trimming (855),
6. inspection and verification (856).

For mounting (851) the ribs (2) the two blocks (20) are placed on each side of the ribs (2) so as to make a block which can be handled easily to fit ribs (2) into the grooves (19) between different modules (18). The modules are particularly manufactured to ensure compaction during the curing cycle and besides for being dismantled easily.

A sealant is provided at the edges (26) of the surfaces or ribs (2) where the adhesive is placed to avoid the adhesive from flowing unchecked The wedge element (21) for the ribs (2) is then mounted so that it applies a compression pressure between the ribs (2) and the base modules (18). Advantageously this allows avoiding therefore any clearance when curing.

Subsequently the positioning of the spars (5, 6) is performed. The spars (5, 6) are co-bounded to the ribs (2); hence application of structural adhesive film on the edges (26) of the ribs (2) is performed.

In a particular embodiment, the wedge elements (21) for the ribs (2) are split into separate parts. Advantageously, this allows ensuring the proper demoulding (854) of each wedge element (21).

In FIG. 9 there is a representation of the base structure (8) of a torsion box (1) manufactured with a method for manufacturing base structure (8) of a torsion box (1) according to the invention.

Figure 5:
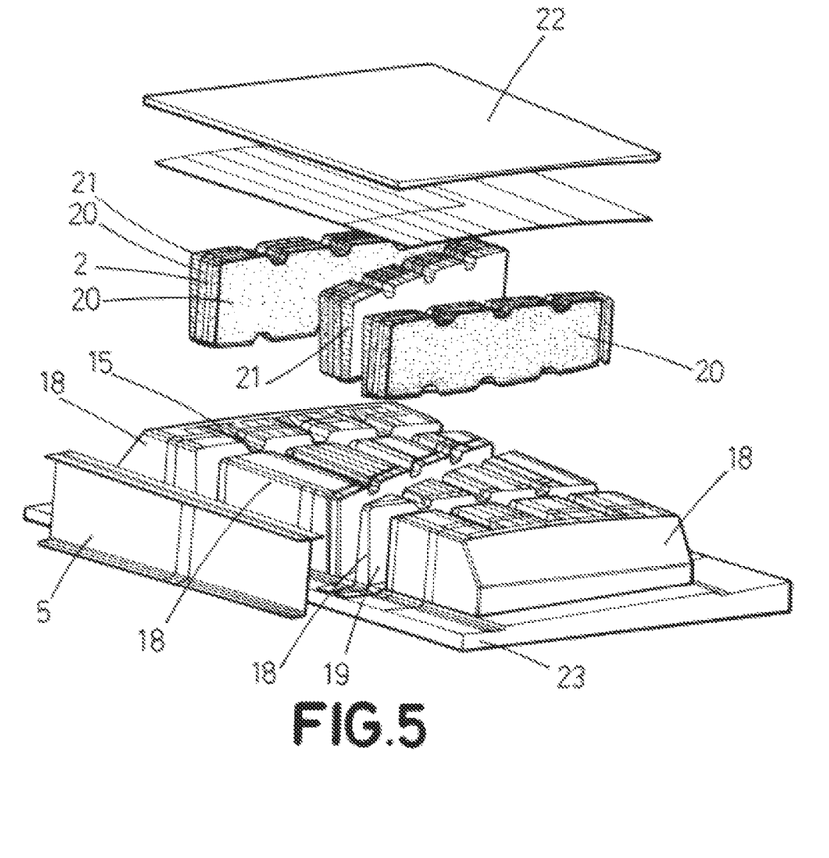
FIG. 5 This figure shows the tooling for manufacturing a torsion box (1) and some parts of the torsion box according to the invention. There can be distinguished:
base modules (18),
front spar (5) of the torsion box (1) to be manufactured,
two blocks (20) for the ribs (2),
a wedge element (21) for the ribs,
a caul plate (22),
a base plate (23).
Figure 10:
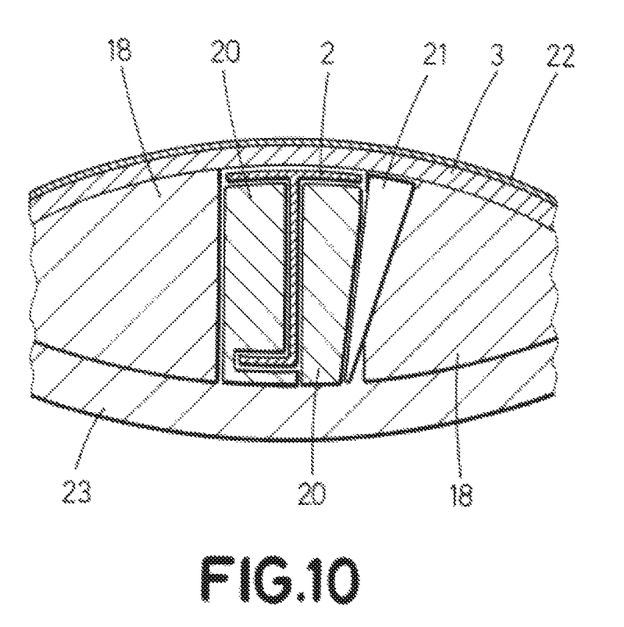
FIG. 10 This figure shows a portion of a cross section of the tooling corresponding to the location of a rib comprising base modules (18), two blocks (20) for the ribs (2), a wedge element (21) for the ribs, a caul plate (22) and a base plate (23). There is also represented a "J" shaped rib (2) and the lower skin (3)

After the mentioned reinforcements (ribs (2), spars (5, 6) and stringers (4)) are placed, positioning of the lower skin (3) is performed. The lower skin (3) is positioned on the top of the tooling, as shown in FIGS. 5 and 10.

In a particular embodiment, all the tooling elements are pin positioned to a base plate (23) to assure correct positioning of the ribs (2).

In a particular embodiment, all the tooling elements are provisioned with latches or metallic elements to be transported. Advantageously this allows the whole tooling being transported easily.

After all the parts are positioned the step c.—of the method of the present invention is performed, in which the base structure (8) is subjected to a single curing (853) cycle. Subsequently, after the curing (853) cycle, the cured base structure (8) is demoulded (854) from the tooling and turned so as to position the lower skin (3) upside-down.

Figure 6:
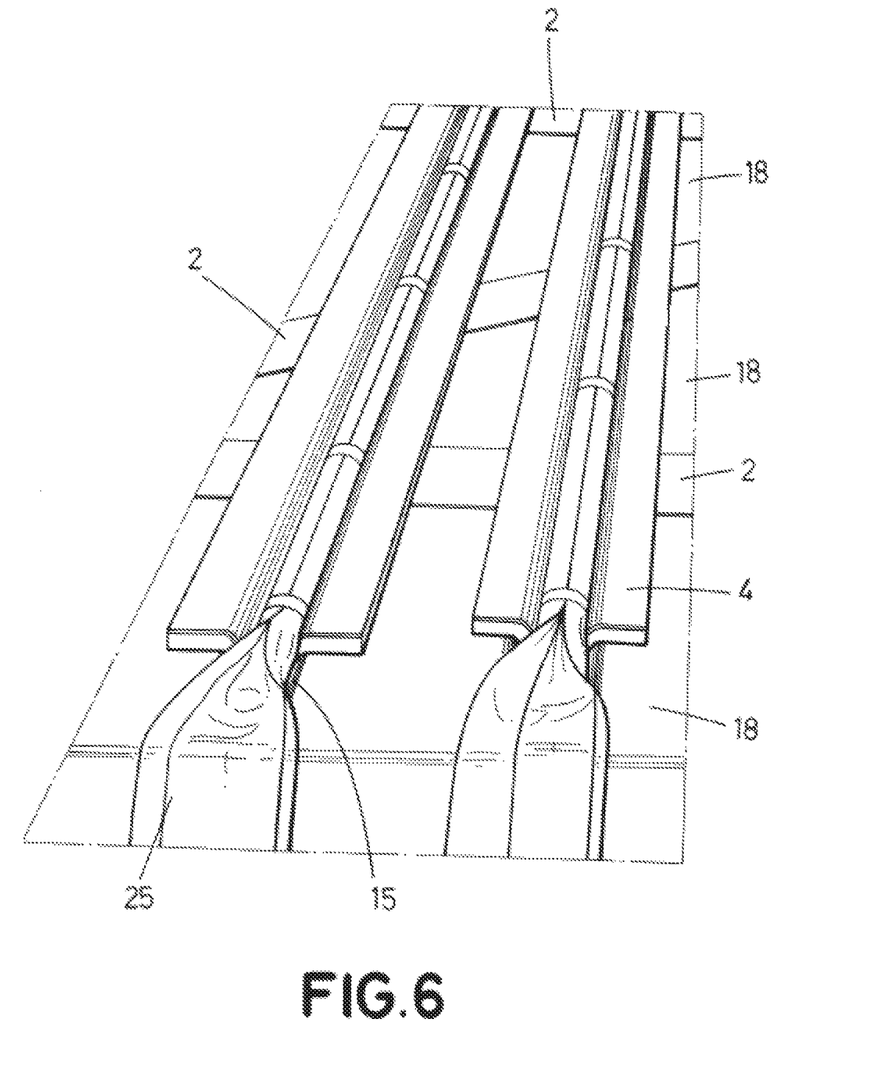
FIG. 6 This figure shows stringers (4) which are mounted on the ribs (2) and base modules (18) using a vacuum bag (25) for compaction during curing.

Compaction (852) is carried out using a vacuum bag (25). The vacuum bag (25) covers the whole tooling with the elements mounted, and it (25) is also placed in the stringers (4), as shown in FIG. 6.

In a particular embodiment, the base modules are further adapted to house intermediate spars by comprising grooves so as to fit the intermediate spars into the grooves for curing.

Method for Manufacturing an Aeronautical Torsion Box (1):

The method for manufacturing an aeronautical torsion box (1) for an aircraft (11) according to the invention comprises the steps of:
d1.—providing a cured base structure (8) manufactured according to the method explained previously,
d2.—providing an upper skin (7) reinforced with at least one stringer, and
d3.—joining (86) the upper skin (7) to the cured base structure (8).

The joining in step d3.—can be performed via any joining method.

In a particular embodiment, step d3.—is performed by co-bonding a fresh upper skin (7) to the cured base structure (8).

In a particular embodiment step d3.—is performed by riveting a cured upper skin (7) to the cured base structure (8).

Aeronautical Torsion Box (1)

The invention also describes an aeronautical torsion box (1) manufactured via a method according to the invention.

In an embodiment, at least one of the skins (3, 7) of the aeronautical torsion box is stiffened with a plurality of stringers (4) extending all of them along the skin and having a decreasing cross section towards the skin outer edge (10).

In an embodiment of the invention, the aeronautical torsion box (1) comprises stringers (4) arranged in convergent manner. The technical advantage is that even fewer stringers are needed for the torsion box to carry the same imposed loads than in the case in which they only have a decreasing cross section.

The invention claimed is:

1. A method for manufacturing a base structure of an aeronautical torsion box for an aircraft comprising:
    a. providing a fresh skin, a fresh stringer, a fresh front spar, a fresh rear spar, a rib, and a babette, wherein the babettte is a strip covering complete edges of the rib, wherein the rib is at least one of a cured rib made of dry fiber, a cured rib made of a pre-preg and a rib made of metal;
    b. positioning in a curing tool the fresh skin, the fresh stringer, the fresh front spar, the fresh rear spar, the rib with the babette, wherein the babette is positioned between the rib and each of the fresh skin, the fresh front and rear spars, and the fresh stringer, and wherein the fresh skin, the fresh stringer, the fresh front and rear spars and the rib with the babette form an assembly corresponding to a base structure, and
    c. subjecting the assembly, while in the curing tool, to a single curing cycle which cures the fresh skin, the fresh stringer, and the fresh front and rear spars to form a cured base structure which includes the stringer, the front and rear spars, the rib and the babette.

2. The method according to claim 1 further comprising an additional step performed after step c, and the additional step comprising joining the at least one rib by joining elements, the joining elements being one of a fastening means and an adhesive.

3. A method for manufacturing an aeronautical torsion box for an aircraft comprising:
    d1. providing a cured base structure manufactured according to claim 1,
    d2. providing an additional skin to be reinforced by at least one stringer;
    d3. joining an additional fresh skin to the cured base structure, on a side of the cured base structure opposite to the cured fresh skin, and
    d4. a further curing cycle to cure the additional fresh skin to the cured base structure to form the aeronautical torsion box including the stringer, the front and rear spars, and the rib with the babette.

4. The method according to claim 3 wherein the additional fresh skin is a fresh upper skin.

5. Aeronautical torsion box structure manufactured with a method according to claim 3.

6. Aircraft comprising an aeronautical torsion box manufactured with a method according to claim 3.

7. The method according to claim 1 further comprising, before step b, applying an adhesive to the edges of the rib.

8. Tooling for manufacturing a base structure of a torsion box, the tooling comprising:
    base modules adapted to house at least one stringer in a groove between the base modules,
    blocks configured to be positioned in the groove,
    a rib positioned between the blocks in the groove,
    at least a wedge element in the groove and with at least one of the blocks and the rib, wherein the at least one wedge element is configured to apply a compressive force to the rib and at least one of the base modules, and
    a caul plate covering the base modules, the groove, and side edges of the blocks, the rib and the wedge element in the groove.

9. The tooling according to claim 8 further comprising at least one pin positioned to a base plate.

10. The tooling according to claim 8 wherein the base modules are made of steel.

* * * * *